United States Patent
Marupaduga et al.

(10) Patent No.: US 11,115,839 B1
(45) Date of Patent: Sep. 7, 2021

(54) DISTRIBUTION OF MIMO LAYERS AMONG CARRIERS BASED ON CARRIER BANDWIDTH

(71) Applicant: Sprint Spectrum L.P., Overland Park, KS (US)

(72) Inventors: Sreekar Marupaduga, Overland Park, KS (US); Ravi Kallepalli, Overland Park, KS (US); Rajveen Narendran, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 80 days.

(21) Appl. No.: 16/671,484

(22) Filed: Nov. 1, 2019

(51) Int. Cl.
*H04W 4/00* (2018.01)
*H04W 24/02* (2009.01)
*H04W 72/04* (2009.01)
*H04B 7/0413* (2017.01)
*H04W 84/04* (2009.01)

(52) U.S. Cl.
CPC .......... *H04W 24/02* (2013.01); *H04B 7/0413* (2013.01); *H04W 72/0453* (2013.01); *H04W 84/042* (2013.01)

(58) Field of Classification Search
CPC ... H04W 24/02; H04W 72/00; H04W 72/042; H04W 72/044; H04W 72/0453; H04W 72/0493; H04B 7/02; H04B 7/024; H04B 7/04; H04B 7/0413; H04B 7/0452; H04B 7/0495
See application file for complete search history.

(56) References Cited

U.S. PATENT DOCUMENTS

2017/0290014 A1* 10/2017 Kim .................. H04W 4/06
2020/0107265 A1* 4/2020 Hwang ............ H04W 52/0216
2020/0245387 A1* 7/2020 Kwok .................. H04L 5/001

* cited by examiner

*Primary Examiner* — Matthew W Genack

(57) ABSTRACT

A method and system for controlling wireless transmission to a user equipment device (UE) while the UE is served on a plurality of carriers each having a respective downlink bandwidth. An example method includes determining that a first carrier of the plurality of carriers has a wider downlink bandwidth than a second carrier of the plurality of carriers. And the method then includes, based at least on the determining, causing transmission to the UE on the first carrier to use a greater quantity of multiple-input-multiple-output (MIMO) layers than transmission to the UE on the second carrier.

20 Claims, 5 Drawing Sheets

DETERMINE THAT A FIRST CARRIER OF MULTIPLE CARRIERS ON WHICH A UE IS SERVED HAS A WIDER DOWNLINK BANDWIDTH THAN A SECOND CARRIER OF THE MULTIPLE CARRIERS ON WHICH THE UE IS SERVED — 44

BASED AT LEAST ON THE DETERMINATION, CAUSE TRANSMISSION TO THE UE ON THE FIRST CARRIER TO USE A GREATER QUANTITY OF MIMO LAYERS THAN TRANSMISSION TO THE UE ON THE SECOND CARRIER — 46

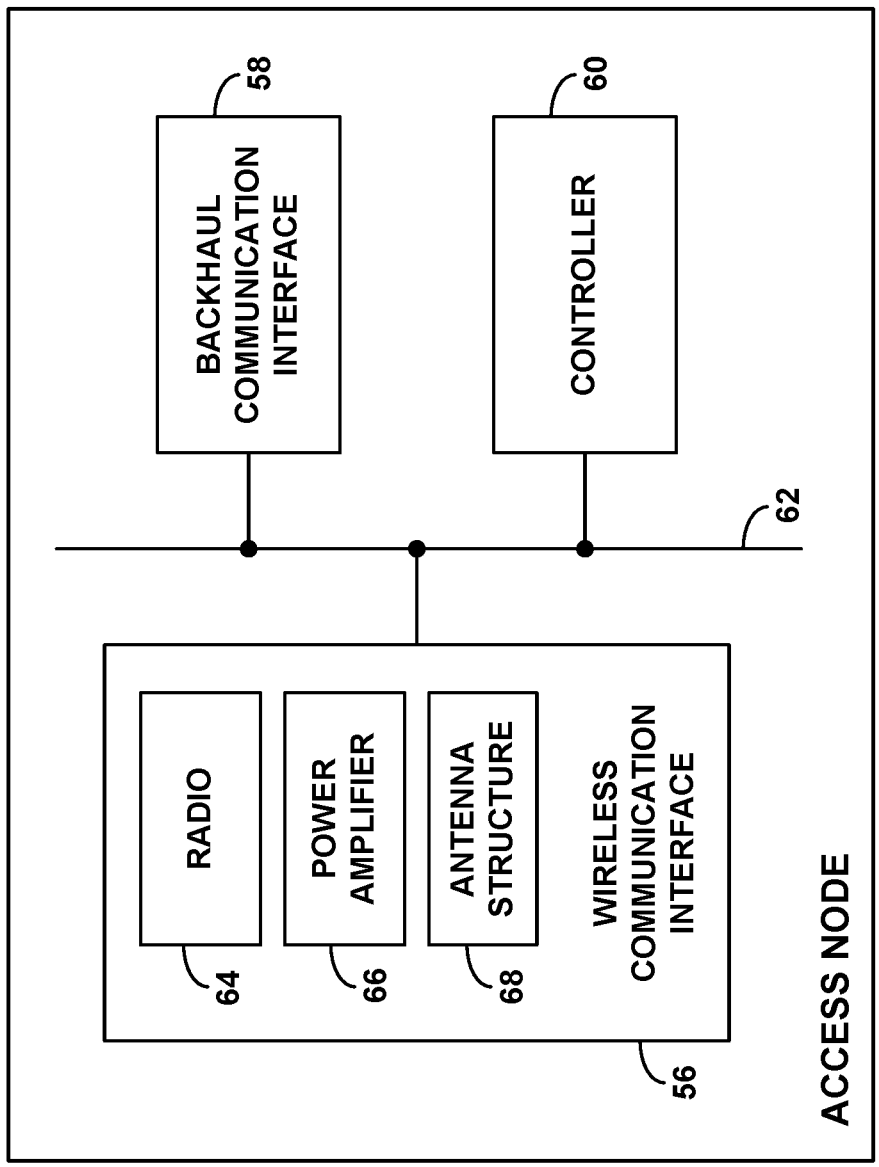

DISTRIBUTION OF MIMO LAYERS AMONG CARRIERS BASED ON CARRIER BANDWIDTH

BACKGROUND

A wireless communication system typically includes a number of access nodes that are configured to provide wireless coverage areas in which user equipment devices (UEs) such as cell phones, tablet computers, tracking devices, embedded wireless modules, and other wirelessly equipped communication devices (whether or not user operated), can operate. In turn, each access node could be coupled with a core network that provides connectivity with one or more transport networks, such as the public switched telephone network (PSTN) and/or the Internet for instance. With this arrangement, a UE within coverage of the system could engage in air interface communication with an access node and could thereby communicate via the access node with various remote network entities or with other UEs served by the access node.

Such a system could operate in accordance with a particular radio access technology, with air-interface communications from the access nodes to UEs defining a downlink or forward link and air-interface communications from the UEs to the access nodes defining an uplink or reverse link.

Over the years, the industry has developed various generations of radio access technologies (RATs), in a continuous effort to increase available data rate and quality of service for end users. These generations have ranged from "1G," which used simple analog frequency modulation to facilitate basic voice-call service, to "4G"—such as Long Term Evolution (LTE), which facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive-MIMO, beamforming, and/or other features, to support higher data rates and countless applications, such as mission-critical services, enhanced mobile broadband, and massive Internet of Things (IoT).

In accordance with an example RAT, each access node could be configured to provide service on one or more carrier frequencies or "carriers." Each carrier could be frequency division duplex (FDD), defining separate frequency channels for downlink and uplink communication, or time division duplex (TDD), defining a single frequency channel multiplexed over time between downlink and uplink use. And each such frequency channel could have a respective bandwidth centered on a respective center frequency, defining a respective range of frequency extending from a low-end frequency to a high-end frequency.

Further, on the downlink and uplink respectively, the air interface defined by each carrier under an example RAT could be structured over time and frequency to define physical air-interface resources for carrying information between the access node and UEs.

Without limitation for instance, the air interface could be divided over time into frames, which can be divided in turn into subframes, timeslots, and symbol time-segments. And the carrier bandwidth (frequency width of the carrier on the downlink and/or uplink) could be divided over frequency into subcarriers. As a result, the air interface could define an array of resource elements per subframe, each occupying a respective subcarrier and spanning a respective symbol time segment, and the subcarrier of each such resource element could be modulated using an applicable modulation scheme to carry data over the air. Further, the air interface could be configured to group these resource elements into physical resource blocks (PRBs) across the carrier bandwidth, and the access node could be configured to allocate some or all of these PRBs for use to carry data on an as-needed basis.

In addition, certain resources on the downlink and/or uplink of each such carrier could be reserved for special purposes. For instance, on the downlink, certain resources could be reserved to carry synchronization signals that UEs could detect as an indication of coverage, other resources could be reserved to carry a reference signal that UEs could measure in order to determine coverage strength, still other resources could be reserved to carry other downlink control-plane signaling from the access node to UEs, and other resources could be reserved to carry scheduled user-plane communications from the access node to UEs. And on the uplink, certain resources could be reserved to carry uplink control-plane signaling from UEs to the access node, and other resources could be reserved to carry scheduled user-plane communications from UEs to the access node.

Overview

When a UE enters into coverage of an example network, the UE could detect threshold strong coverage of an access node on a carrier and could then engage in random-access and connection signaling to establish a Radio Resource Configuration (RRC) connection or the like with the access node on that carrier. Further, if the UE is not already registered for service with the core network, the UE could transmit to the access node an attach request, which the access node could forward to a core-network controller for processing. And the core-network controller could coordinate setup for the UE of one or more user-plane bearers for carrying packet-data communications between the UE and a core-network gateway that provides packet-network connectivity.

Once the UE is connected and registered, the access node could then serve the UE in a connected mode on the carrier, managing downlink air-interface communication of packet data to the UE and uplink air-interface communication of packet data from the UE.

For instance, when data arrives at the access node for transmission to the UE, the access node could buffer the data pending transmission to the UE, and the access node could select and allocate one or more of the carrier's downlink PRBs in an upcoming subframe for use to transmit at least a portion of the data, defining a transport block, to the UE. The access node could then transmit to the UE in a control channel of that subframe a Downlink Control Information (DCI) message that designates the downlink PRBs, and the access node could accordingly transmit the transport block to the UE in those designated downlink PRBs, such as by modulating the subcarriers of resource elements in those PRBs to carry symbols representing the data.

And when the UE has data to transmit to the access node, the UE could buffer the data pending transmission to the access node and could transmit to the access node a scheduling request that carries with it a buffer status report (BSR) indicating how much data the UE has buffered for transmission. And in response, the access node could select and allocate one or more of the carrier's uplink PRBs in an upcoming subframe for carrying a transport block of that data from the UE, and the access node could transmit to the UE (in a downlink control channel of a preceding subframe)

a DCI message that designates those upcoming uplink PRBs. The UE could then accordingly transmit the transport block to the access node in the designated uplink PRBs, such as by modulating the subcarriers of resource elements in those PRBs to carry symbols representing the data.

In an example implementation, an access node may serve multiple UEs at once on a given carrier. Therefore, as data arrives at the access node for transmission to the various UEs on the carrier, the access node may apply a scheduling algorithm in an effort to fairly and appropriately allocate downlink PRBs of the carrier among the various UEs. Likewise, as UEs request uplink resources of the carrier, the access node may apply a scheduling algorithm in an effort to fairly and appropriately allocate uplink PRBs of the carrier among the various UEs. Under certain RATs, an access node may also be able to serve a UE concurrently on multiple carriers, to help increase the peak data rate available to the UE, by increasing the total effective bandwidth and associated throughput available to the UE. To provide such carrier-aggregation service, when a UE is connected with an access node on a first carrier, the access node may add one or more second carriers to the UE's connection and then serve the UE on a combination of the first carrier and the second carrier(s). When data is to be transmitted over the air between the access node and the UE, the access node could then schedule transmission of the data on PRBs distributed across the multiple carriers (component carriers) of the UE's connection.

In addition, networks and UEs may also support simultaneous connectivity on connections according to multiple different RATs, which could also help increase the peak data rate available to the UE, by multiplexing data communication onto multiple concurrent connections each on one or more respective carriers and thus likewise increasing the total effective bandwidth and associated throughput available to the UE.

With the transition from 4G LTE to 5G NR, for instance, some UEs may be configured to support connections according to both of those RATs concurrently, with an arrangement referred to as EUTRA-NR Dual Connectivity (EN-DC). To facilitate this, a UE could include both a 4G LTE radio that establishes a 4G LTE connection on one or more carriers with a 4G LTE access node (evolved Node B (eNB)) and a 5G NR radio that establishes a 5G NR connection on one or more carriers with a 5G NR access node (next generation Node B (gNB)). The two access nodes could then serve the UE with packet-data communications on both connections concurrently, with a portion of data flowing over the UE's 4G LTE connection concurrently with another portion of the data flowing over the UE's 5G NR connection.

One of the key performance metrics of any such wireless communication system is its spectral efficiency, namely, the extent of data that the system can carry per unit of frequency spectrum. The spectral efficiency of a wireless communication system or its access nodes could be measured as a quantity of bits per Hertz.

If a wireless communication system has low spectral efficiency, a provider of the system may need to configure the system with additional licensed spectrum, such as wider carriers and/or more carriers, in order to accommodate subscriber communication needs. However, adding licensed spectrum could be costly and therefore undesirable.

One way to help improve spectral efficiency, while also helping to increase a UE's peak data rate, is to make use of MIMO technology.

With MIMO, an access node can engage in air interface communication concurrently on multiple different radio-frequency (RF) propagation paths, or MIMO "layers," with multiple layers occupying the same frequency resources (e.g., subcarriers and PRBs) as each other. To facilitate this, the access node could be equipped with a MIMO antenna array, comprising multiple transmit antennas and multiple receive antennas. By suitably weighting and precoding transmissions by particular antennas in the array, and through use of other techniques, the access node can then output multiple separate but concurrent transmissions. Because these concurrent transmissions occupy the same frequency resources (e.g., PRBs and subcarriers) as each other, MIMO can thereby provide "MIMO gain" representing an increase in the access node's spectral efficiency, which may help to avoid or defer the need to add more spectrum.

Further, MIMO can be used in a "single-user MIMO" (SU-MIMO) configuration to help increase the peak data rate of transmission to a given UE, by multiplexing communications to the UE onto multiple separate layers using the same air-interface resources as each other. For instance, when an access node has data to transmit to the UE, the access node could time-division-multiplex the data into multiple data streams, the access node could modulate the data streams onto the same PRBs as each other, and the access node could output the modulated data streams onto separate antenna ports for concurrent transmission to the UE. Making use of two or more receive antennas, and the UE could estimate the channel distortion at each of its antennas and could then use those estimates as a basis to separately compute and uncover each of the access node's transmit signals.

In order provide many such layers at once, an access node could be equipped with a massive-MIMO antenna array, which might include on the order of tens, hundreds, or even thousands of antennas. For instance, a representative massive-MIMO antenna array could include 128 antennas, of which 64 might be configured as transmit antennas and the other 64 might be configured as receive antennas. With this arrangement, if 4 transmit antennas are used per layer (e.g., to facilitate beamforming), the massive-MIMO antenna array might support on the order of 16 concurrent layers. Other arrangements could be used as well.

Although serving a UE with SU-MIMO may thus help to increase both spectral efficiency and peak data rate, there may be some technical limitations with providing a UE with SU-MIMO service. On technical limitation is that the UE may support up to only a limited number of concurrent MIMO layers per carrier on which the UE is served. For instance, a UE may support use of up to just 4 MIMO layers per carrier. Further, another technical limitation is that the UE may support up to only a limited number of concurrent MIMO layers in total on the one or more carriers on which the UE is served. For instance, a UE may support use of up to just 12 MIMO layers in total across the one or more carriers on which the UE is served.

These or other such MIMO-layer limits might result from hardware and/or software configuration of the UE and/or from network service policies or the like, and might be specified in stored configuration or capabilities data for the UE or in another manner. When one or more access nodes serve the UE, the access node(s) may then apply one or more such MIMO-layer limits, to restrict the number of MIMO layers used concurrently for transmission to the UE on a given carrier and/or in total across multiple carriers on which the UE is served, even though the access node(s) may support use of a greater number of MIMO layers per carrier or in total.

A technical challenge posed by these MIMO-layer limits is that, if a UE is served concurrently on multiple carriers and will be served with SU-MIMO by one or more access nodes, the access node(s) may need to determine how to distribute the UE's maximum number of MIMO layers among the carriers on which the UE is being served. For instance, if a UE is being served on 4 carriers and if the UE has a per-carrier limit of 4 MIMO layers and a total limit of 12 MIMO layers, the UE's serving access node(s) may need to determine how to distribute the total of 12 MIMO layers among the UE's 4 serving carriers.

A simple solution would be to divide the UE's maximum total number of MIMO layers equally among the UE's serving carriers, provided that the allocation of layers per carrier would not exceed the UE's per-carrier limit. In the example just mentioned, for instance, the access node(s) could divide the 12 MIMO layers into 3 MIMO layers per carrier, which would be within the UE's limit of 4 MIMO layers per carrier.

But the present disclosure provides an improved mechanism for distribution of MIMO layers among multiple carriers on which a UE is served.

In accordance with the disclosure, distribution of MIMO layers among the multiple carriers on which a UE is served will be done based at least on the relative downlink bandwidths of the carriers, in an effort to provide the UE with more MIMO layers on a wider-bandwidth carrier than on a narrower-bandwidth carrier. Namely, when a UE is being served one multiple carriers of varying bandwidth, the UE's serving access node(s) will use a greater number of MIMO layers for transmission to the UE on a first one of the carriers than on a second one of the carriers based on the first carrier being wider than the second carrier.

Distributing MIMO layers in this manner may help to improve overall spectral efficiency, by using more MIMO layers with a potentially greater quantity of PRBs available in a wider-bandwidth carrier and using fewer MIMO layers with a likely lesser quantity of PRBs available in a narrower-bandwidth carrier.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

BRIEF DESCRIPTION OF THE DRAWINGS

FIG. 5 is a simplified block diagram of an access node operable in accordance with the disclosure.

DETAILED DESCRIPTION

An example implementation will now be described in the context of a system that supports service of a UE on multiple carriers concurrently under one or more RATs such as 4G LTE, 5G NR, or one or more others now known or later developed. It should be understood, however, that other variations from the specific arrangements and processes described are possible. For instance, various described entities, connections, functions, and other elements could be added, omitted, distributed, re-located, re-ordered, combined, or changed in other ways. In addition, operations described as being performed by one or more entities could be implemented in various ways, such as by processing unit executing instructions stored in non-transitory data storage, along with associated circuitry or other hardware, among other possibilities.

Figure 1:
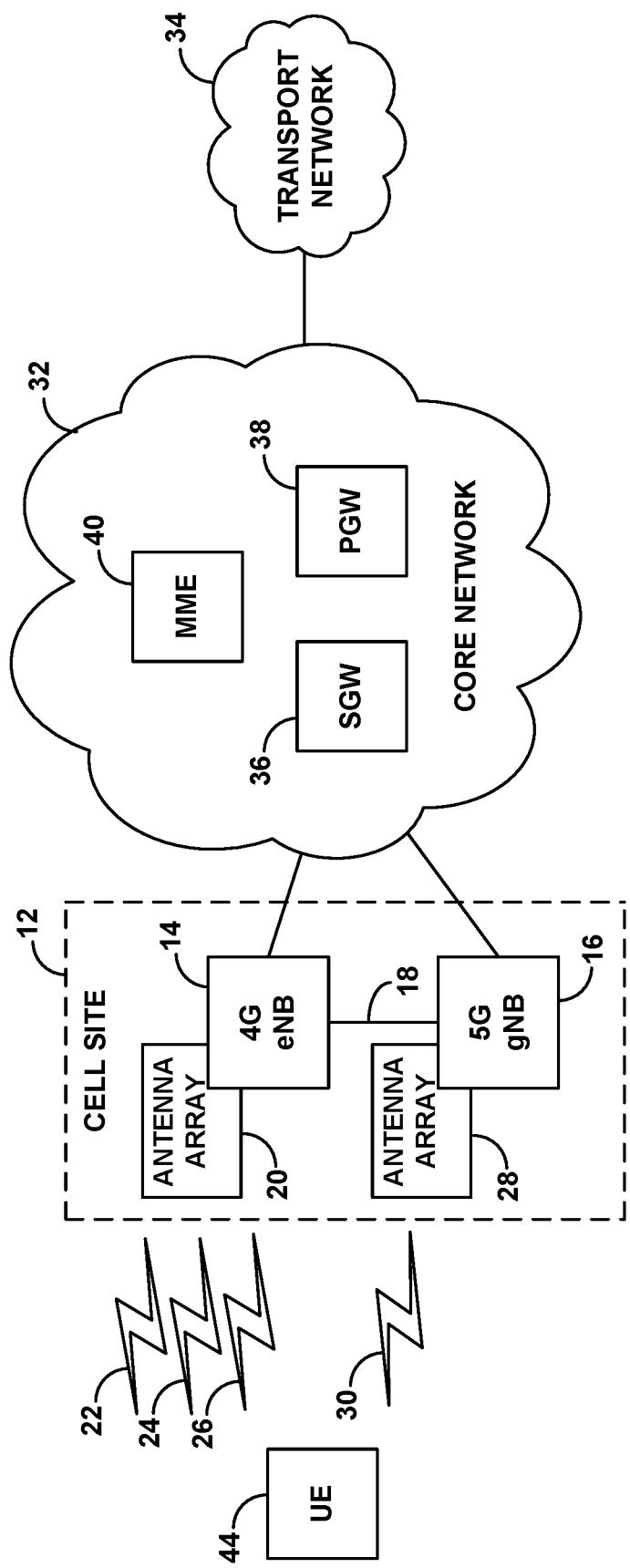
FIG. 1 is a simplified block diagram of a wireless communication system in which aspects of the present disclosure can be implemented.

FIG. 1 depicts an example system including a cell site 12 that contains a 4G eNB 14 and a 5G gNB 16. These access nodes could be integrated together or could be provided separately, possibly sharing certain components such as an antenna tower, a baseband unit, and a backhaul interface for example, and the access nodes could be configured with a signaling interface (e.g., an X2 interface) 18 through which to exchange signaling with each other. Further, each access node could take various forms, such as a macro access node, a small-cell access node, or a relay access node, among other possibilities.

In an example implementation, the 4G eNB 14 includes an antenna array 20 and is configured to provide 4G coverage and service on multiple 4G carriers 22, 24, 26, and the 5G gNB 16 includes an antenna array 28 and is configured to provide 5G coverage and service on a representative 5G carrier 30.

Each of these carriers could be FDD or TDD and could have a respective downlink bandwidth, with the downlink bandwidths of some of the carriers differing from each other. For example, 4G carrier 22 might be a TDD carrier with a downlink bandwidth of 20 MHz, 4G carriers 24 and 26 might each be an FDD carrier with a downlink bandwidth of 10 MHz, and 5G carrier 30 might be a TDD carrier with a downlink bandwidth of 60 MHz. And as another example, 4G carriers 22, 24, 26 might each be a TDD carrier with a downlink bandwidth of 20 MHz, and 5G carrier 30 might be a TDD carrier with a downlink bandwidth of 60 MHz. Numerous other examples are possible as well.

The air interface on each such carrier could also be configured as described above. Namely, each carrier could be divided over time and frequency to define an array of time-frequency resource elements in which subcarriers can be modulated to carry data communications. And these resource elements could be divided into groups per subframe to define the PRBs noted above, which could be allocable by the associated access node on an as-needed basis to carry data communications. Further, certain resource elements per subframe could be reserved for other purposes as discussed above.

In addition, the 4G air interface and 4G service provided by 4G eNB 14 on each 4G carrier 22, 24, 26 could differ from the 5G air interface and 5G service provided by the 5G gNB 16 on each 5G carrier 30 in various ways now known or later developed. For example, one may provide variable subcarrier spacing, and the other may provide fixed subcarrier spacing. As another example, one may have different symbol time segments than the other. As still another example, one may make use of different MIMO technologies than the other. And as yet another example, with TDD carriers, one may have a flexible TDD configuration and the other may have a fixed TDD configuration. Other examples are possible as well.

In the example arrangement of FIG. 1, the 4G eNB 14 and 5G gNB 16 are both interfaced with a core network 32, which could be an evolved packet core (EPC) network, a next generation core (NGC) network, or another network including components that may provide connectivity with at least one transport network 34, such as the Internet. In an example implementation as shown, the core network includes a serving gateway (SGW) 36 and a packet-data network gateway (PGW) 38, which cooperatively provide user-plane connectivity with the transport network 34. Further, the core network includes a mobility management entity (MME) 40, which serves as a core-network controller. Other core-network arrangements are also possible.

FIG. 1 further illustrates a representative UE 42 within coverage of cell site 12. In an example implementation, when UE 42 enters into coverage of the cell site, the UE may initially scan for 4G LTE coverage (e.g., rather than 5G coverage) and may detect threshold strong coverage of 4G eNB 14 on 4G carrier 22. In line with the discussion above, the UE may then engage in random access and RRC signaling with the 4G eNB 14 on 4G carrier 22 in order to establish a 4G connection through which the 4G eNB 14 could then serve the UE on that carrier. And if appropriate, the UE may engage in attach signaling with the MME 40 via the 4G eNB 14 in order to register for service.

Upon connection and/or attachment of the UE, the 4G eNB 14 may obtain capabilities data of the UE and may store the capabilities data within a context record for the UE for reference when serving the UE. For instance, the MME 40 may obtain this data from a subscriber profile store and transmit it to the 4G eNB 14, or the UE may transmit this data to the 4G eNB 14. Among other information, this capabilities data could indicate MIMO-layer limits of the UE, such as the maximum number of MIMO layers in total that the UE supports for concurrent downlink transmission and an indication of the maximum number of MIMO layers that the UE supports for downlink transmission per carrier.

In an example implementation, once the UE is so connected on 4G carrier 22 with the 4G eNB 14, the 4G eNB 14 could then serve the UE on that carrier as discussed above. On the downlink for instance, as the 4G eNB 14 receives packet-data destined to the UE, the 4G eNB 14 could allocate downlink PRBs in a subframe on 4G carrier 22 to carry the data to the UE, and the 4G eNB 14 could transmit to the UE a DCI message that specifies the allocated PRBs and could transmit the data to the UE in those PRBs.

Further, in line with the discussion above, the 4G eNB 14 might also work to configure carrier aggregation service and/or EN-DC service for the UE, so that the UE could then be served concurrently on multiple carriers.

As to carrier aggregation service, for instance, the 4G eNB 14 could add to the UE's 4G connection one or more additional carriers such as 4G carriers 24 and 26. To facilitate this, the 4G eNB 14 might direct the UE to scan for additional 4G coverage and, upon receipt of a measurement report from the UE indicating that the UE detects threshold strong coverage of the 4G eNB 14 on carriers 24 and 26, might then direct the UE to add those carriers to its 4G connection and might update a UE context record to indicate that the UE's 4G connection encompasses those carriers. The 4G eNB 14 could then provide the UE with carrier-aggregation service on the combination of 4G carriers 22, 24, 26.

In an example carrier-aggregation scenario, one of the UE's multiple serving carriers could be deemed a primary component carrier (PCC) and might function as an anchor for key control signaling such as DCI messaging between the UE and the 4G eNB 14, whereas each other of the UE's serving carriers could be deemed a secondary component carrier (SCC) of the UE's service, used primarily to help increase the UE's peak data rate. For instance, carrier 22 might be the PCC, and carriers 24, 26 might be SCCs. Or carrier 24 might be made a PCC, with carriers 22, 26 being SCCs.

Thus, in an example implementation, when the 4G eNB 14 has packet-data to transmit to the UE, the 4G eNB 14 may allocate some downlink PRBs respectively of each of the UE's serving carriers in a given subframe, the 4G eNB 14 may transmit to the UE in that subframe a DCI message specifying the allocated PRBs of the various carriers, and the 4G eNB 14 may transmit the data to the UE in those allocated PRBs across the carriers.

As to EN-DC service, the 4G eNB 14 could coordinate establishment of a secondary, 5G connection between the UE and the 5G gNB 16 on 5G carrier 30. To facilitate this, the 4G eNB 14 might direct the UE to scan for 5G coverage and, upon receipt of a measurement report from the UE indicating that the UE detects threshold strong coverage of the 5G gNB 16 on carrier 30, might then engage in signaling to add the secondary connection for the UE. For instance, the 4G eNB 14 might engage in signaling with the 5G gNB 16 and with the UE to arrange for establishment of the 5G connection on carrier 30. Further, the 4G eNB 14 might engage in signaling with the MME 40 and the 5G gNB 16 to coordinate setup of a split-bearer arrangement so as to enable the 4G eNB 14 and 5G gNB 16 to concurrently serve respective portions of the UE's data communication.

With EN-DC service set up for the UE, the 4G eNB 14 and 5G gNB 16 could then concurrently serve the UE on their respective connections with the UE, over the combination of one or more 4G carriers (possibly on a single 4G carrier 22 or with carrier-aggregation service on multiple 4G carriers such as carriers 22, 24, 26) and at least the one 5G carrier 30. On the downlink, for instance, when the core network has packet-data for transmission to the UE, a portion of that data may flow ultimately to the 4G eNB 14 for transmission to the UE over the UE's 4G connection, and another portion of the data may flow ultimately to the 5G gNB 16 for transmission to the UE over the UE's 5G connection. The 4G eNB 14 and 5G gNB 16 may then each schedule and provide transmission of their respective portion of the UE's data in a common subframe, concurrently on 4G PRBs allocated by the 4G eNB 14 and 5G PRBs allocated by the 5G gNB 16.

When the UE is served on multiple carriers, through carrier aggregation, dual-connectivity, or another arrangement, each of the UE's one or more serving access nodes may also apply SU-MIMO to engage in transmission to the UE concurrently on multiple MIMO layers respectively on each of one or more of the carriers as noted above. To facilitate this, the respective antenna array of each such access node could be a massive-MIMO array as described above.

Figure 2:
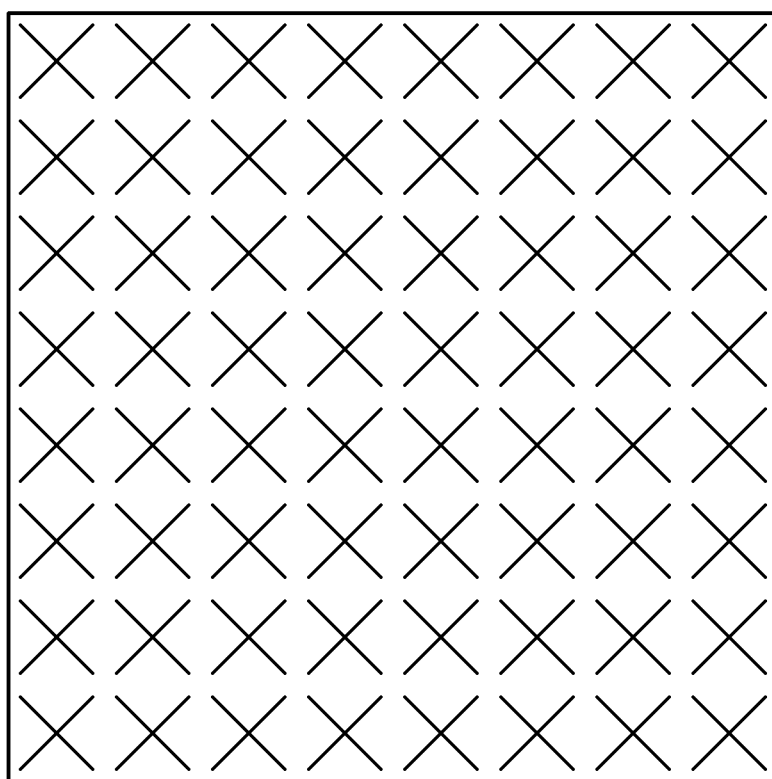
FIG. 2 is a simplified diagram of an example massive-MIMO antenna array that could be implemented according to the disclosure.

FIG. 2 is a simplified diagram of an example massive-MIMO array that could represent a structure of antenna array 20 and/or as antenna array 28 in the arrangement of FIG. 1. In this illustration, each X represents two antennas (or antenna elements), one with positive polarization and one with negative polarization. As a result, each column in the example array includes eight antennas with positive polarization and eight antennas with negative polarization. As there are eight columns of antennas, the massive-MIMO array thus has a total of 128 antennas. In a representative implementation, 64 of these antennas could be configured as transmit (downlink) antennas, and the other 64 could be configured as receive (uplink) antennas. For instance, all of the antennas with positive polarization could be configured as transmit antennas, and all of the antennas with negative polarization could be configured as receive antennas.

An access node equipped with this massive-MIMO antenna array may be able to provide 16 layers of MIMO transmission. For instance, for each layer, the access node could use 4 of its transmit antennas to provide beamformed transmission defining a respective MIMO layer. Thus, as noted above, the access node may in theory be able to transmit with up to 16 layers on a common set of air interface resources (e.g., PRBs). Other MIMO arrangements are possible as well.

To apply SU-MIMO for transmission to a UE on a set of one or more PRBs allocated for transmission to the UE in a given subframe on a given carrier, the access node could include in its DCI message to the UE both an indication of the allocated PRBs and an indication of the number of MIMO layers on which the access node will transmit to the UE on the allocated PRBs. The access node could then accordingly transmit to the UE using the indicated number of MIMO layers on the allocated PRBs, and the UE could accordingly receive those transmissions from the access node.

As noted above, considering the UE's MIMO-layer limits, the present disclosure provides for distributing MIMO layers among the UE's multiple serving carriers based on the relative bandwidths of the serving carriers.

In the example carrier-aggregation scenario described above, if the 4G eNB 14 serves the UE concurrently on 4G carriers 22, 24, 26 and if the downlink bandwidths of two or more of those carriers differ from each other, then 4G eNB 14 could divide the UE's maximum supported number of MIMO layers among the carriers based on a comparison of those bandwidths. In particular, the 4G eNB 14 could compare the downlink bandwidths of the UE's multiple serving carriers, and based on that comparison, the 4G eNB 14 could use more MIMO layers for transmission to the UE on a wider bandwidth carrier than on a narrower bandwidth carrier.

For example, in an arrangement where the downlink bandwidth of carrier 22 is 20 MHz and the downlink bandwidths of each of carriers 22, 24 is 10 MHz, the 4G eNB 14 could determine that the downlink bandwidth of carrier 22 is greater than the downlink bandwidth of carrier 24 and, based on that determination, could use more MIMO layers for transmission to the UE on carrier 22 than on carrier 26. In addition, the 4G eNB 14 could determine that the downlink bandwidth of carrier 22 is greater than the downlink bandwidth of carrier 26 and, based on that determination, could use more MIMO layers for transmission to the UE on carrier 22 than on carrier 26. Further, the 4G eNB 14 could determine that the downlink bandwidths of carriers 24 and 26 are the same as each other and, based on that determination, could use the same number of MIMO layers for transmission to the UE on each of those carriers.

Thus, in an example scenario where the UE supports a maximum of 8 MIMO layers in total across the UE's multiple serving carriers and the UE supports a maximum of 4 MIMO layers per carrier, the 4G eNB 14 could decide to use 4 MIMO layers for transmission to the UE on carrier 22 and just 2 MIMO layers for transmission to the UE respectively on each of carriers 24, 26.

Likewise, in an example EN-DC scenario where the 4G eNB 14 serves the UE on one or more of the 4G carriers concurrently with the 5G gNB 16 serving the UE on 5G carrier 30, the 4G eNB 14 and 5G gNB could coordinate division of the UE's maximum number of MIMO layers among the UE's serving carriers based on a comparison of the relative bandwidths of the carriers. Here, for instance, the 4G eNB 14 might operate to control this process and might engage in signaling with the 5G gNB 16 accordingly to direct implementation of a respective MIMO limitation.

For example, in an arrangement where the UE is not served with carrier aggregation but is served with EN-DC on a combination of 4G carrier 22 and 5G carrier 30, the 4G eNB 14 could determine that the downlink bandwidth of 5G carrier 30 is greater than the downlink bandwidth of 4G carrier 22 and could therefore coordinate use of more MIMO layers for transmission to the UE on 5G carrier 30 than on 4G carrier 22. For instance, if the UE supports a maximum total of 6 MIMO layers and a maximum of 4 MIMO layers per carrier, then the 4G eNB 14 could direct and thus cause the 5G gNB 16 to use 4 MIMO layers for transmission to the UE on 5G carrier 30 while the 4G eNB itself uses just 2 MIMO layers for transmission to the UE on 4G carrier 22.

As another example, in an arrangement where the UE is served with 4G carrier aggregation on 4G carriers 22, 24, 26, where each of those carriers has a downlink bandwidth of 20 MHz, and where the UE is concurrently served on 5G carrier 30 having a downlink bandwidth of 60 MHz, the 4G eNB 16 could determine that the downlink bandwidth of 5G carrier 30 is greater than the downlink bandwidth of each of 4G carriers 22, 24, 26 and could therefore coordinate use of more MIMO layers for transmission to the UE on 5G carrier 30 than on each of those 4G carriers. For instance, if the UE supports a maximum total of 10 MIMO layers and a maximum of 4 MIMO layers per carrier, then the 4G eNB 14 could direct and thus cause the 5G gNB 16 to use 4 MIMO layers for transmission to the UE on 5G carrier 30 while the 4G eNB itself uses just 2 MIMO layers for transmission to the UE on each of 4G carriers 22, 24, 26.

As still another example, in an arrangement where the UE is served with 4G carrier aggregation on 4G carriers 22, 24, 26, where 4G carrier 22 has a downlink bandwidth of 20 MHz, where 4G carriers 24, 26 each have a downlink bandwidth of 10 MHz, and where the UE is concurrently served on 5G carrier 30 having a downlink bandwidth of 60 MHz, the 4G eNB 16 could determine that the downlink bandwidth of 5G carrier 30 is greater than the downlink bandwidth of each of 4G carriers 24, 26 and could therefore coordinate use of more MIMO layers for transmission to the UE on 5G carrier 30 than on each of those 4G carriers.

Further, in this scenario, the 4G eNB 14 might determine that the downlink bandwidth of 4G carrier 22 is greater than the downlink bandwidth of each of 4G carriers 24, 26 and might therefore coordinate use of more MIMO layers for transmission to the UE on 4G carrier 22 than respectively on each of 4G carriers 24, 26. Moreover, the 4G eNB 14 might operate to use more MIMO layers for transmission to the UE on 4G carrier 22 than respectively on each of 4G carriers 24, 26 on grounds that 4G carrier 22 is the UE's PCC and 4G carriers 24, 26 are the UE's SCCs.

Thus, in an example scenario where the UE supports a maximum of 12 MIMO layers in total across the UE's multiple serving carriers and the UE supports a maximum of 4 MIMO layers per carrier, the 4G eNB 14 could decide that the 5G gNB 16 should use 4 MIMO layers for transmission to the UE on 5G carrier 30, that the 4G eNB 14 should use 4 MIMO layers for transmission to the UE on 4G carrier 22, and that the 4G eNB 14 should use 2 MIMO layers for transmission to the UE respectively on each of carriers 24, 26.

Numerous other examples could be possible as well.

Figure 3:
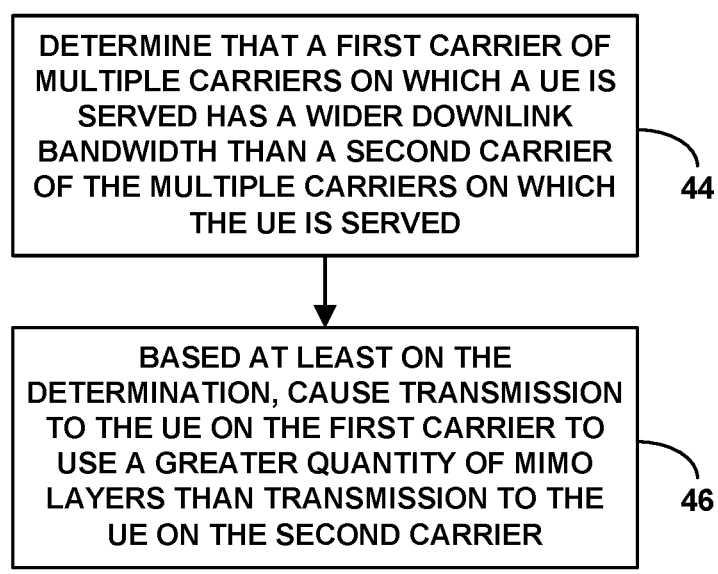
FIG. 3 is a flow chart depicting operations that can be carried out in accordance with the disclosure.

FIG. 3 is next a flow chart depicting an example method that could be carried out in accordance with the present disclosure, to control wireless transmission to a UE while the UE is served on multiple carriers each having a respective downlink bandwidth. This method could be carried out by a computing system at one or more access nodes serving a UE and/or at one or more other entities. In the example arrangement of FIG. 1, for instance, the method could be carried out by a computing system at the 4G eNB 14 possibly working in combination with the 5G gNB 16. Alternatively, the method could be carried out by a computing system at a core-network element management system (EMS) server or the like configured to coordinate operation of one more access nodes.

As shown in FIG. 3, at block 44, the method includes determining that a first carrier of the multiple carriers has a wider downlink bandwidth than a second carrier of the multiple carriers (e.g., based on comparing the carriers' downlink bandwidths). And at block 46, the method includes, based at least on the determining, causing transmission to the UE on the first carrier to use a greater quantity of MIMO layers than transmission to the UE on the second carrier. Here, transmission on the first carrier could be concurrent with transmission on the second carrier.

In line with the discussion above, this method could be carried out by an access node that is serving the UE with carrier aggregation on the multiple carriers, where the transmission to the UE on the first carrier is concurrent with the transmission to the UE on the second carrier.

Further, the method could be carried out while the UE is served with dual connectivity (e.g, EN-DC) by a first access node (e.g., a 5G gNB) over a first connection (e.g., a 5G NR connection) on at least the first carrier and by a second access node (e.g., a 4G eNB) over a second connection (e.g., a 4G LTE connection) on at least the second carrier, or vice versa. And in that case, the method might be carried out by the first access node, possibly working cooperatively with the second access node. Or the method might be carried out by the second access node, possibly working cooperatively with the first access node.

As carried out by the second access node, for instance the act of causing transmission to the UE on the first carrier to use a greater quantity of MIMO layers than transmission to the UE on the second carrier could involve (i) directing by the second access node the first access node to use a first quantity of MIMO layers for the transmission to the UE on the first carrier and (ii) using by the second access node a second quantity of MIMO layers for the transmission to the UE on the second carrier, the first quantity being greater than the second quantity. In this or other example implementations, the first quantity might be 4 MIMO layers and the second quantity might be 2 MIMO layers. But numerous other examples are possible as well.

Further, as discussed above, the method could additionally involve determining a maximum total number of MIMO layers that the UE supports and determining a maximum number of MIMO layers that the UE supports per carrier. And in that case, the act of causing transmission to the UE on the first carrier to use a greater quantity of MIMO layers than transmission to the UE on the second carrier could be further based on the determined maximum total number of MIMO layers that the UE supports and the determined maximum number of MIMO layers that the UE supports per carrier. For instance, as discussed above, the UE's maximum total number of MIMO layers could be distributed among the multiple carriers on which the UE is served, staying within the per-carrier limit and also using more MIMO layers on a wider carrier than on a narrower carrier.

Figure 4:
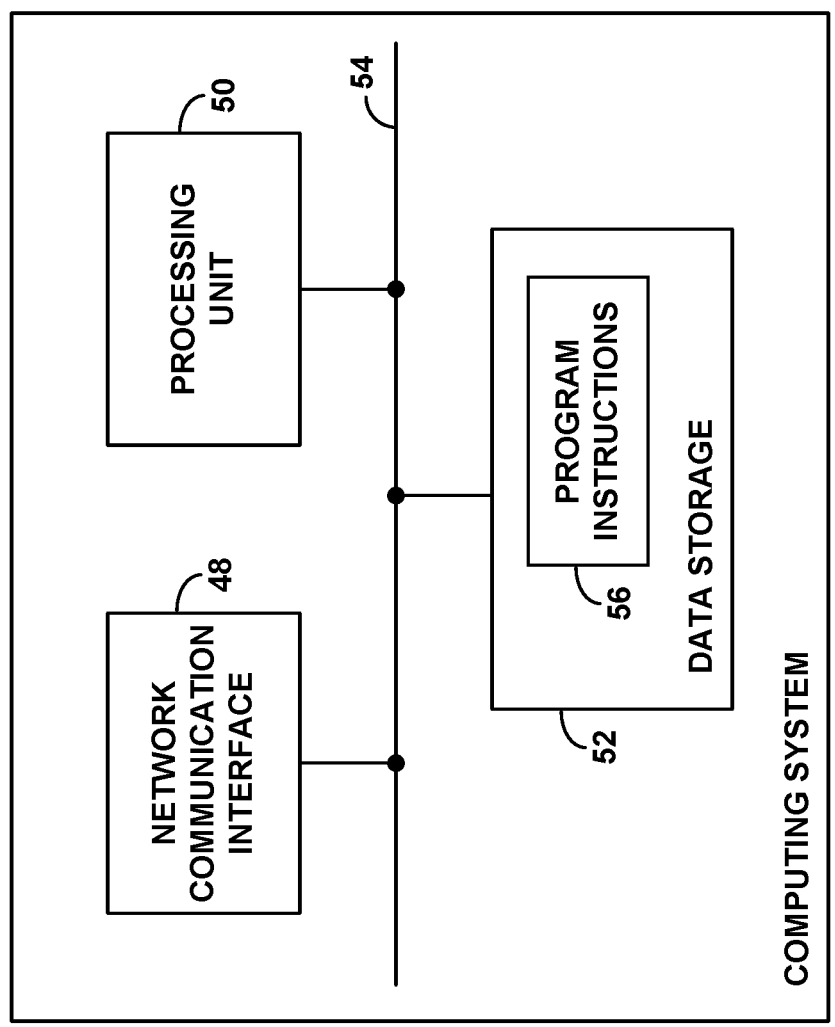
FIG. 4 is simplified block diagram of a computing system operable in accordance with the disclosure.

FIG. 4 is a simplified block diagram of an example computing system that could be configured to carry out the method of FIG. 3 or variants of that method. As shown in FIG. 4, the example computing system includes a network communication interface 48, a processing unit 50, and non-transitory data storage 52, all of which could be integrated together and/or interconnected by a system bus, network, or other connection mechanism 54.

The network communication interface 48 could include a physical network connector and associated communication logic to facilitate network communication with various other entities. The processing unit 50 could comprise one or more general purpose processors (e.g., microprocessors) and/or one or more special-purpose processors (e.g., application specific integrated circuits). And the data storage 52 could comprise one or more volatile and/or non-volatile storage components (e.g., magnetic, optical, or flash storage).

As shown, the data storage 52 could then store program instructions, which could be executable by the processing unit 50 to carry out various operations described herein. For instance, the instructions could be executable to carry out the operations of FIG. 4 while a UE is served on multiple carriers each having a respective downlink bandwidth.

In line with the discussion above, this computing system could be implemented at least in part at an access node (e.g., by one or more components of the access node), with the operations being carried out while the access node is serving the UE on at least one of the first and second carriers. For instance, the operations could be carried out while the access node is serving the UE with carrier aggregation on a combination of the first carrier and the second carrier. Or the operations could be carried out while the access node and another access node are serving the UE with dual connectivity including one access node serving UE on one of the first and second carriers while the other access node is serving the UE on the other of the first and second carriers. Still alternatively, the computing system might be implemented by an EMS of a core network.

Finally, FIG. 5 is a simplified block diagram of an example access node that could operate in accordance with the present disclosure to control wireless transmission to a UE. As shown in FIG. 5, the example access node includes a wireless communication interface 56, a backhaul communication interface 58, and a controller 60, which could be integrated together and/or communicatively linked by a network, system bus, or other connection mechanism 62.

Wireless communication interface 56 includes a radio 64, a power amplifier 66, and antenna structure 68. The radio 64 could operate to interface between encoded baseband signals and radio frequency signals. The power amplifier 66 could operate to amplify signals for transmission by the antenna structure 68. And the antenna structure 68 could comprise a plurality of antennas for communicating over the air interface, optimally as an array such as a massive-MIMO array for instance.

Backhaul communication interface 58 could be a network communication interface (e.g., an Ethernet network interface port and/or connection) through which the access node can communicate with various other network entities.

And controller 60, which could comprise a processing unit, data storage, and program instructions stored in the data storage and executable by the processing unit, or could take other forms, could be operable to cause the access node to carry out various operations as described herein when the UE is served on a plurality of carriers each having a respective downlink bandwidth and wherein the UE is served on at least one of the carriers by the access node Various features described above can be implemented in this context, and vice versa.

For instance, the controller could carry out operations as described above while the access node is serving the UE with carrier aggregation on a combination of at least the first carrier and the second carrier. Or the access node could be a first access node, and the controller could carry out the operations while the first access node and a second access node are serving the UE with dual connectivity on the multiple carriers.

Exemplary embodiments have been described above. Those skilled in the art will understand, however, that changes and modifications may be made to these embodiments without departing from the true scope and spirit of the invention.

We claim:

1. A method of controlling wireless transmission to a user equipment device (UE), the method comprising, while the UE is served on a plurality of carriers each having a respective downlink bandwidth:
    determining that a first carrier of the plurality of carriers has a wider downlink bandwidth than a second carrier of the plurality of carriers;
    based at least on the determining, causing transmission to the UE on the first carrier to use a greater quantity of multiple-input-multiple-output (MIMO) layers than transmission to the UE on the second carrier.

2. The method of claim 1, wherein determining that the first carrier has a wider downlink bandwidth than the second carrier comprises:
    comparing downlink bandwidth of the first carrier with the downlink bandwidth of the second carrier; and
    based on the comparing, determining that the first carrier has wider downlink bandwidth than the second carrier.

3. The method of claim 1, wherein the method is carried out by an access node that is serving the UE with carrier aggregation on the plurality of carriers, wherein the transmission to the UE on the first carrier is concurrent with the transmission to the UE on the second carrier.

4. The method of claim 3, wherein the first quantity is 4 MIMO layers and wherein the second quantity is 2 MIMO layers.

5. The method of claim 1, wherein the method is carried while the UE is served with dual connectivity by a first access node over a first connection on at least the first carrier and by a second access node over a second connection on at least the second carrier.

6. The method of claim 5, wherein the first connection is a 4G LTE connection, wherein the second connection is a 5G NR connection, and wherein the dual connectivity is EUTRA-NR dual connectivity (EN-DC).

7. The method of claim 5, wherein the method is carried out by the first access node.

8. The method of claim 5, wherein the method is carried out by the second access node, and wherein causing transmission to the UE on the first carrier to use a greater quantity of MIMO layers than transmission to the UE on the second carrier comprises (i) directing by the second access node the first access node to use a first quantity of MIMO layers for the transmission to the UE on the first carrier and (ii) using by the second access node a second quantity of MIMO layers for the transmission to the UE on the second carrier, wherein the first quantity is greater than the second quantity.

9. The method of claim 8, wherein the first quantity is 4 MIMO layers, and wherein the second quantity is 2 MIMO layers.

10. The method of claim 8, wherein the transmission to the UE on the first carrier is current with the transmission to the UE on the second carrier.

11. The method of claim 1, further comprising:
    determining a maximum total number of MIMO layers that the UE supports, and determining a maximum number of MIMO layers that the UE supports per carrier,
    wherein the causing of transmission to the UE on the first carrier to use a greater quantity of MIMO layers than transmission to the UE on the second carrier is further based on the determined maximum total number of MIMO layers that the UE supports and the determined maximum number of MIMO layers that the UE supports per carrier.

12. A computing system comprising:
    a processing unit;
    non-transitory data storage; and
    program instructions stored in the non-transitory data storage and executable by the processing unit to carry out operations while a user equipment device (UE) is served on a plurality of carriers each having a respective downlink bandwidth, the operations including:
        determining that a first carrier of the plurality of carriers has a wider downlink bandwidth than a second carrier of the plurality of carriers;
        based at least on the determining, causing transmission to the UE on the first carrier to use a greater quantity of multiple-input-multiple-output (MIMO) layers than transmission to the UE on the second carrier.

13. The computing system of claim 12, wherein the computing system is implemented at least in part at an access node, and wherein the operations are carried out while the access node is serving the UE on at least one of the first and second carriers.

14. The computing system of claim 12, wherein the computing system is implemented at least in part at an access node, and wherein the operations are carried out while the access node is serving the UE with carrier aggregation on a combination of the first carrier and the second carrier.

15. The computing system of claim 12, wherein the computing system is implemented at least in part at a first access node, and wherein the operations are carried out while the first access node and a second access node are serving the UE with dual connectivity including the first access node serving UE on one of the first and second carriers while a second access node is serving the UE on the other of the first and second carriers.

16. The computing system of claim 12, wherein the computing system is implemented at least in part at an element management system of a core network.

17. An access node configured to control wireless transmission to a user equipment device (UE), the access node comprising:
    a wireless communication interface including an antenna structure through which the access node engages in air-interface communication;
    a controller configured to carry out operations when the UE is served on a plurality of carriers each having a respective downlink bandwidth and wherein the UE is served on at least one of the carriers by the access node, the operations including:

determining that a first carrier of the plurality of carriers has a wider downlink bandwidth than a second carrier of the plurality of carriers;

based at least on the determining, causing transmission to the UE on the first carrier to use a greater quantity of multiple-input-multiple-output (MIMO) layers than transmission to the UE on the second carrier.

18. The access node of claim 17, wherein the controller carries out the operations while the access node is serving the UE with carrier aggregation on a combination of at least the first carrier and the second carrier, wherein the causing of transmission to the UE on the first carrier to use a greater quantity of MIMO layers than transmission to the UE on the second carrier comprises the access node concurrently engaging in (i) transmission to the UE on the first carrier using a first quantity of MIMO layers and (ii) transmission to the UE on the second carrier using a second quantity of MIMO layers, wherein the first quantity is greater than the second quantity.

19. The access node of claim 17, wherein the access node is a first access node, and wherein the controller carries out the operations while the first access node and second access node are serving the UE with dual connectivity in which the first access node serves the UE over a first connection on at least one of the first and second carriers and the second access node serves the UE on a second connection on the at least the other of the first and second carriers.

20. The access node of claim 19, wherein the first connection is a 4G LTE connection, wherein the second connection is a 5G NR connection, and wherein the dual connectivity is EUTRA-NR dual connectivity (EN-DC).

* * * * *